US009748832B2

(12) United States Patent
Nishikawa

(10) Patent No.: US 9,748,832 B2
(45) Date of Patent: Aug. 29, 2017

(54) POWER CONVERTER AND POWER CONVERSION METHOD

(71) Applicant: Katsuya Nishikawa, Tokyo (JP)

(72) Inventor: Katsuya Nishikawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 61 days.

(21) Appl. No.: 14/764,949

(22) PCT Filed: Feb. 5, 2013

(86) PCT No.: PCT/JP2013/052607
§ 371 (c)(1),
(2) Date: Jul. 30, 2015

(87) PCT Pub. No.: WO2014/122727
PCT Pub. Date: Aug. 14, 2014

(65) Prior Publication Data
US 2015/0364987 A1 Dec. 17, 2015

(51) Int. Cl.
H02H 9/04 (2006.01)
H02M 1/32 (2007.01)
(Continued)

(52) U.S. Cl.
CPC ............... *H02M 1/32* (2013.01); *H02H 3/16* (2013.01); *H02H 3/33* (2013.01); *H02H 7/10* (2013.01);
(Continued)

(58) Field of Classification Search
CPC .................. H02H 9/04; H02H 9/041
(Continued)

(56) References Cited

U.S. PATENT DOCUMENTS

2011/0116196 A1* 5/2011 Kellis ............... H02H 7/0816
361/30

FOREIGN PATENT DOCUMENTS

JP 02-106131 A 4/1990
JP 06-141404 A 5/1994
(Continued)

OTHER PUBLICATIONS

Inventor: Makino Tomoyoshi; Publication No. JP-2010-273455; Feb. 12, 2010; Device for control of electric vehicle.*
(Continued)

*Primary Examiner* — Dharti Patel
(74) *Attorney, Agent, or Firm* — Buchanan Ingersoll & Rooney PC

(57) ABSTRACT

A line-to-ground fault location detector detects, based on a difference between a current flowing from a power transmission circuit to a load circuit, and a current flowing from the load circuit to the power transmission circuit, whether a line-to-ground fault is occurring at a power-transmission-circuit side or a load-circuit side. A contactor controller opens a first contactor when the load circuit detects the occurrence of the line-to-ground fault, and when a line-to-ground fault location detector detects that a location of the line-to-ground fault is at the power-transmission-circuit side, the contactor controller maintains the open state of the first contactor even if an operation to instruct closing of the first contactor is made after the first contactor is opened.

7 Claims, 15 Drawing Sheets

(51) Int. Cl.
  *H02H 3/33* (2006.01)
  *H02H 3/16* (2006.01)
  *H02H 7/10* (2006.01)
  *H02H 7/12* (2006.01)
(52) U.S. Cl.
  CPC ........ *H02H 7/1203* (2013.01); *H02H 7/1216* (2013.01)
(58) Field of Classification Search
  USPC .......................................................... 361/42
  See application file for complete search history.

(56) References Cited

FOREIGN PATENT DOCUMENTS

| | | | |
|---|---|---|---|
| JP | 07-177603 | A | 7/1995 |
| JP | 11-235039 | A | 8/1999 |
| JP | 2006-311692 | A | 11/2006 |
| JP | 2010-273455 | A | 12/2010 |
| JP | 2012-029479 | A | 2/2012 |
| JP | 2012-223020 | A | 11/2012 |

OTHER PUBLICATIONS

International Search Report (PCT/ISA/210) mailed on Apr. 16, 2013, by the Japanese Patent Office as the International Searching Authority for International Application No. PCT/JP2013/052607.
Written Opinion (PCT/ISA/237) mailed on Apr. 16, 2013, by the Japanese Patent Office as the International Searching Authority for International Application No. PCT/JP2013/052607.

\* cited by examiner

Patent Literature 5: Unexamined Japanese Patent Application Kokai Publication No. H02-106131

POWER CONVERTER AND POWER CONVERSION METHOD

TECHNICAL FIELD

The present disclosure relates to a power converter and a power conversion method.

BACKGROUND ART

Power converters need to be protected against when a line-to-ground fault occurs.

According to a technology disclosed in Patent Literature 1, contactors are connected to respective ends of a secondary winding in a transformer, and these contactors are opened when a line-to-ground fault occurs. According to this technology, by opening the two contactors, a line-to-ground fault current does not flow into the transformer, thereby preventing the transformer from being damaged.

Patent Literatures 2 to 5 disclose technologies of detecting a line-to-ground fault. The technology disclosed in Patent Literature 2 installs a current detector, and assumes that the line-to-ground fault has occurred when the current detector detects a current, and shuts off a breaker connected to an overhead line. According to this technology, power supply from the overhead line is broken by opening the breaker, and thus circuits can be protected.

According to the technology disclosed in Patent Literature 3, a wire on the positive side of a transformer and a wire on a negative side of the transformer are connected to a current detector so as to allow the current flowing through both wires to flow in the same direction. According to this technology, the current does not flow through the current detector when a line-to-ground fault occurs at the negative side of the transformer, and thus the line-to-ground fault at the negative side of the transformer can be detected.

According to the technology disclosed in Patent Literature 4, an essential load and a power supply device are connected via a breaker, and a normal load and the power supply device are connected via a specific breaker. According to this technology, the breaker trips when the line-to-ground fault occurs at the essential load, and the specific breaker trips when the line-to-ground fault occurs at the normal load. According to this technology, even if the line-to-ground fault occurs at the one load, the power can be continuously supplied to the other load.

According to the technology disclosed in Patent Literature 5, a residual current transformer is installed, and when the residual current transformer detects a current, a breaker connected to a main line for supplying power from a transforming station is opened. According to this technology, the current flowing from the main line is broken by opening the breaker, thereby protecting high-voltage power receiving equipment.

CITATION LIST

Patent Literature

Patent Literature 1: Unexamined Japanese Patent Application Kokai Publication No. H11-235039
Patent Literature 2: Unexamined Japanese Patent Application Kokai Publication No. H06-141404
Patent Literature 3: Unexamined Japanese Patent Application Kokai Publication No. 2012-29479
Patent Literature 4: Unexamined Japanese Patent Application Kokai Publication No. H07-177603
Patent Literature 5: Unexamined Japanese Patent Application Kokai Publication No. H02-106131

SUMMARY OF INVENTION

Technical Problem

For example, according to the technology disclosed in Patent Literature 1, it is necessary to install the contactors at both terminals of the secondary winding of the transformer, and thus there is a problem that is an increase in size of the power converter.

The present disclosure has been made in view of the aforementioned circumstances, and an objective of the present disclosure is to provide a power converter which has a function of cutting off a line-to-ground fault current, and which can be downsized, and a power conversion method.

Solution to Problem

To achieve the objectives above, there is provided in accordance with the present disclosure, a power converter including a power transmission circuit that outputs AC power upon receiving power supplied from an external circuit. A first contactor controls making and breaking of a current that flows between the power transmission circuit and the external circuit. A load circuit is operated by the power that is output by the power transmission circuit, and detects a current flowing through a grounded terminal, thus capable of detecting an occurrence of a line-to-ground fault. A second contactor controls making and breaking of a current that flows between the power transmission circuit and the load circuit. A line-to-ground fault location detector detects, based on a difference between a current flowing from the power transmission circuit to the load circuit and a current flowing from the load circuit to the power transmission circuit, whether the line-to-ground fault is occurring at a power-transmission-circuit side or at a load-circuit side. A contactor controller controls the first contactor and the second contactor based on a detection result by the load circuit on the occurrence of the line-to-ground fault, and a detection result by the line-to-ground fault location detector.

Advantageous Effects of Invention

According to the present disclosure, the line-to-ground fault current can be broken, and the downsizing is possible.

DESCRIPTION OF EMBODIMENTS

Hereinafter, a power converter according to Embodiments of the present disclosure will be described with reference to the figures.

(Embodiment 1)

Figure 1:
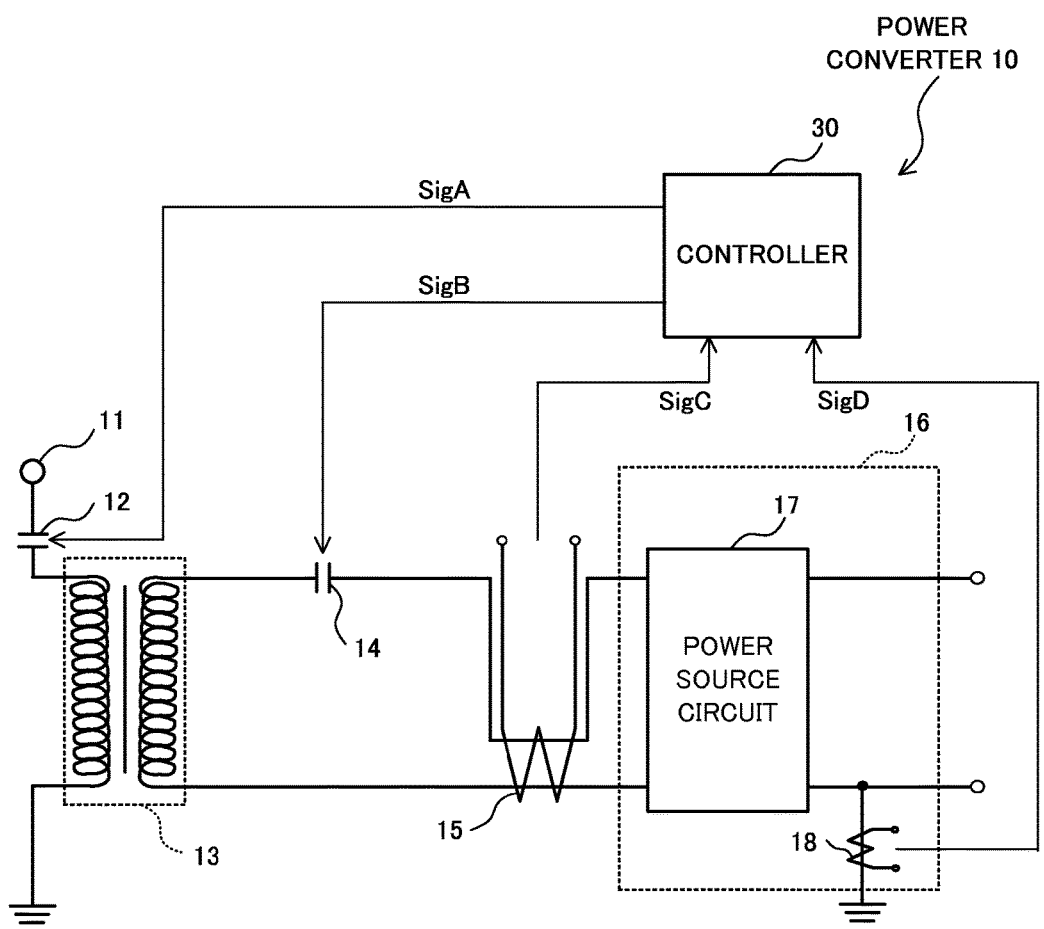
FIG. 1 is a structural diagram of a power converter according to Embodiment 1 of the present disclosure.

A power converter 10 according to Embodiment 1 includes, as illustrated in FIG. 1, a current input terminal 11, a first contactor 12, a power transmission circuit 13, a second contactor 14, a line-to-ground fault location detector 15, a load circuit 16, and a controller 30.

An AC voltage is applied to the current input terminal 11.

The first contactor 12 includes, for example, an electromagnetic contactor, has one end thereof connected to the current input terminal 11, and has the other end thereof connected to an input terminal of the power transmission circuit 13. In response to a control signal SigA that is output by the controller 30, the first contactor 12 closes or opens an electrical path connecting the current input terminal 11 with the input terminal of the power transmission circuit 13, thereby allowing a current flowing between the current input terminal 11 and the power transmission circuit 13 to make or to break the current. Hence, power supply from an external circuit to the power transmission circuit 13 and shutting off of the power supply can be controlled.

By closing (making) the first contactor 12, the power transmission circuit 13 receives the power supplied from the external circuit via the current input terminal 11 and the first contactor 12. The power transmission circuit 13 includes, for example, an insulation type transformer having a primary winding that is connected between the first contactor 12 and the ground, and a secondary winding having both ends thereof connected to a pair of output terminals, respectively.

The second contactor 14 includes the electromagnetic contactor, has one end thereof connected to one output terminal of the power transmission circuit 13, and has the other end connected to one input terminal of the load circuit 16. In response to a control signal SigB that is output by the controller 30, the second contactor 14 closes or opens an electrical path connecting the one output terminals of the power transmission circuit 13 with the one input terminals of the load circuit 16. The second contactor 14 allows the current (power supplied from the power transmission circuit 13 to the load circuit 16) flowing between the power transmission circuit 13 and the load circuit 16 to make or break the current.

The line-to-ground fault location detector 15 is a sensor that enables the controller 30 to detect whether a location of the line-to-ground fault occurring in the power converter 10 is above the line-to-ground fault location detector 15 (the output terminal side of the power transmission circuit 13) or below (the load circuit 16 side). The line-to-ground fault location detector 15 includes a Hall element, a current transformer, and the like, and obtains a difference between a current flowing through a first electrical path between the one output terminal of the power transmission circuit 13 and the one input terminal of the load circuit 16, and, a current flowing through a second electrical path between the other output terminal of the power transmission circuit 13 and the other input terminal of the load circuit 16. The line-to-ground fault location detector outputs, to the controller 30, a voltage signal SigC indicating the obtained current difference.

In a steady state, the current flowing through the first electrical path and the current flowing through the second electrical path have opposite flow directions but have the same values. Thus, the line-to-ground fault location detector 15 outputs the voltage signal SigC of substantially 0 V. Conversely, when the line-to-ground fault occurs at a position above the line-to-ground fault location detector 15 (in the power transmission circuit 13, or between the power transmission circuit 13 and the line-to-ground fault location detector 15), the line-to-ground fault current flows through either the first electrical path or the second electrical path, and thus a current difference is produced. Hence, the line-to-ground fault location detector 15 outputs the voltage signal SigC that has a voltage corresponding to the current difference. Yet conversely, when the line-to-ground fault occurs at a position below the line-to-ground fault location detector 15 (between the line-to-ground fault location detector 15 and the load circuit 16, or in the load circuit 16), the line-to-ground fault current flows through both of the first electrical path and the second electrical path, and no current difference is produced. Thus, the line-to-ground fault location detector 15 generates the voltage signal SigC of substantially 0 V.

The load circuit 16 is a circuit that is operated by AC power supplied from the power transmission circuit 13. One input terminal of the load circuit 16 is connected to the other terminal of the second contactor 14 via the first electrical path. The other input terminal of the load circuit 16 is connected to the other output terminal of the power transmission circuit 13 via the second electrical path. The load circuit 16 is capable of detecting the line-to-ground fault by detecting the line-to-ground fault current that flows through a grounded terminal among the local output terminals.

The load circuit 16 includes a power source circuit 17 and a line-to-ground fault detector 18.

The power source circuit 17 generates output power to be supplied to the backward stage of the circuit from input power.

The line-to-ground fault detector 18 is a current sensor that enables the controller 30 to detect the occurrence of the line-to-ground fault. The line-to-ground fault detector 18 includes a Hall element, a current transformer, and the like, measures the line-to-ground fault current that flows between a grounded output terminal of the power source circuit 17 and the ground, and outputs, to the controller 30, a voltage signal SigD indicating a voltage corresponding to the magnitude of the measured current.

The controller 30 is a circuit that determines whether or not the line-to-ground fault occurs, determines a location where the line-to-ground fault occurs, and controls the opening and the closing of the first contactor 12 and the second contactor 14 in accordance with the location of the occurring line-to-ground fault.

Figure 2:
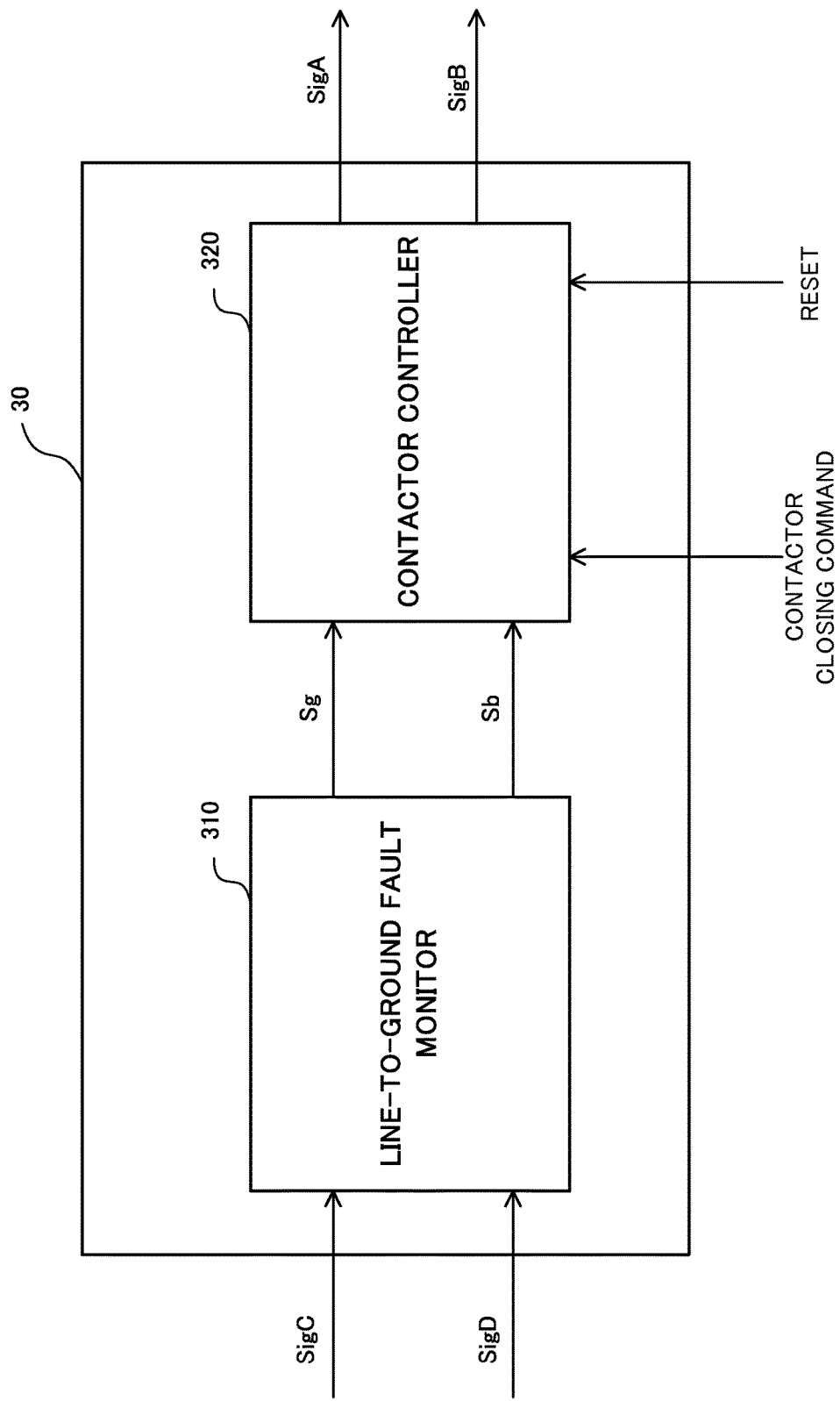
FIG. 2 is a block diagram of a controller illustrated in FIG. 1.

As illustrated in FIG. 2, the controller 30 includes a line-to-ground fault monitor 310, and a contactor controller 320.

The line-to-ground fault monitor 310 includes, for example, a group of comparators, and compares a voltage of the voltage signal SigD that is output by the line-to-ground fault detector 18 with a preset first threshold value, and when determining that the voltage of the voltage signal SigD is equal to or greater than the first threshold value, the line-to-ground fault monitor outputs a line-to-ground fault detection signal Sg indicating the occurrence of the line-to-ground fault.

In addition, the line-to-ground fault monitor 310 compares a voltage of the voltage signal SigC that is output by the line-to-ground fault location detector 15 with a preset second threshold value, and when determining that the voltage of the voltage signal SigC is equal to or greater than the second threshold value, the line-to-ground fault monitor outputs a line-to-ground fault location detection signal Sb indicating that the location of the line-to-ground fault is above the line-to-ground fault location detector 15. Conversely, when determining that the voltage of the voltage signal SigC is smaller than the second threshold value, the line-to-ground fault monitor 310 outputs no line-to-ground fault location detection signal Sb because the location of the line-to-ground fault is below the line-to-ground fault location detector 15.

The contactor controller 320 includes, for example, a microprocessor, outputs the control signals SigA and SigB in response to the line-to-ground fault detection signal Sg and the line-to-ground fault location detection signal Sb that are output by the line-to-ground fault monitor 310, and opens or closes the respective electrical paths of the first contactor 12 and the second contactor 14 that are set in advance.

In addition, the contactor controller 320 receives, in accordance with an instruction from a user, a contactor closing command for instructing the closing of the first contactor 12 and the second contactor 14. The contactor controller 320 closes, in the normal operation, the first contactor 12 and the second contactor 14 in response to the contactor closing command, but as will be discussed later, after the line-to-ground fault occurs at a position above the line-to-ground fault location detector 15, and the first contactor 12 is opened, the contactor controller will no longer close the first contactor 12 even if the contactor closing command is supplied. This condition is resettable by a reset signal.

Figure 3:
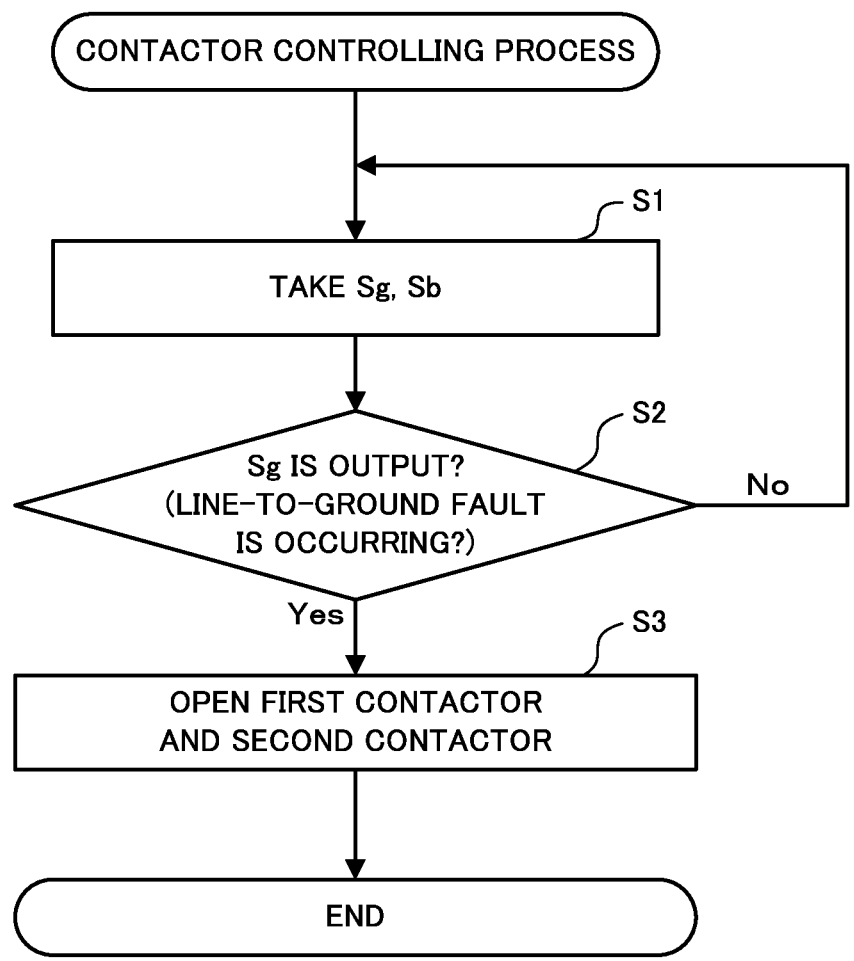
FIG. 3 is a flowchart of a contactor controlling process executed by a contactor controller illustrated in FIG. 2.

More specifically, the contactor controller 320 executes a contactor controlling process illustrated in FIG. 3, periodically takes (step S1) the line-to-ground fault detection signal Sg and the line-to-ground fault location detection signal Sb from the line-to-ground fault monitor 310, and stores these signals in a non-volatile memory.

Next, the contactor controller 320 determines (step S2) whether or not the line-to-ground fault detection signal Sg is output, and when determining that no line-to-ground fault detection signal Sg is output (step S2; No), the contactor controller returns the process to the step S1 since there is no line-to-ground fault.

Conversely, when the line-to-ground fault detection signal Sg is output (step S2; Yes), the contactor controller opens (step S3) the first contactor 12 and the second contactor 14. Hence, power supply to the power converter 10 is terminated, thereby preventing a damage to the converter caused by the line-to-ground fault.

Figure 4:
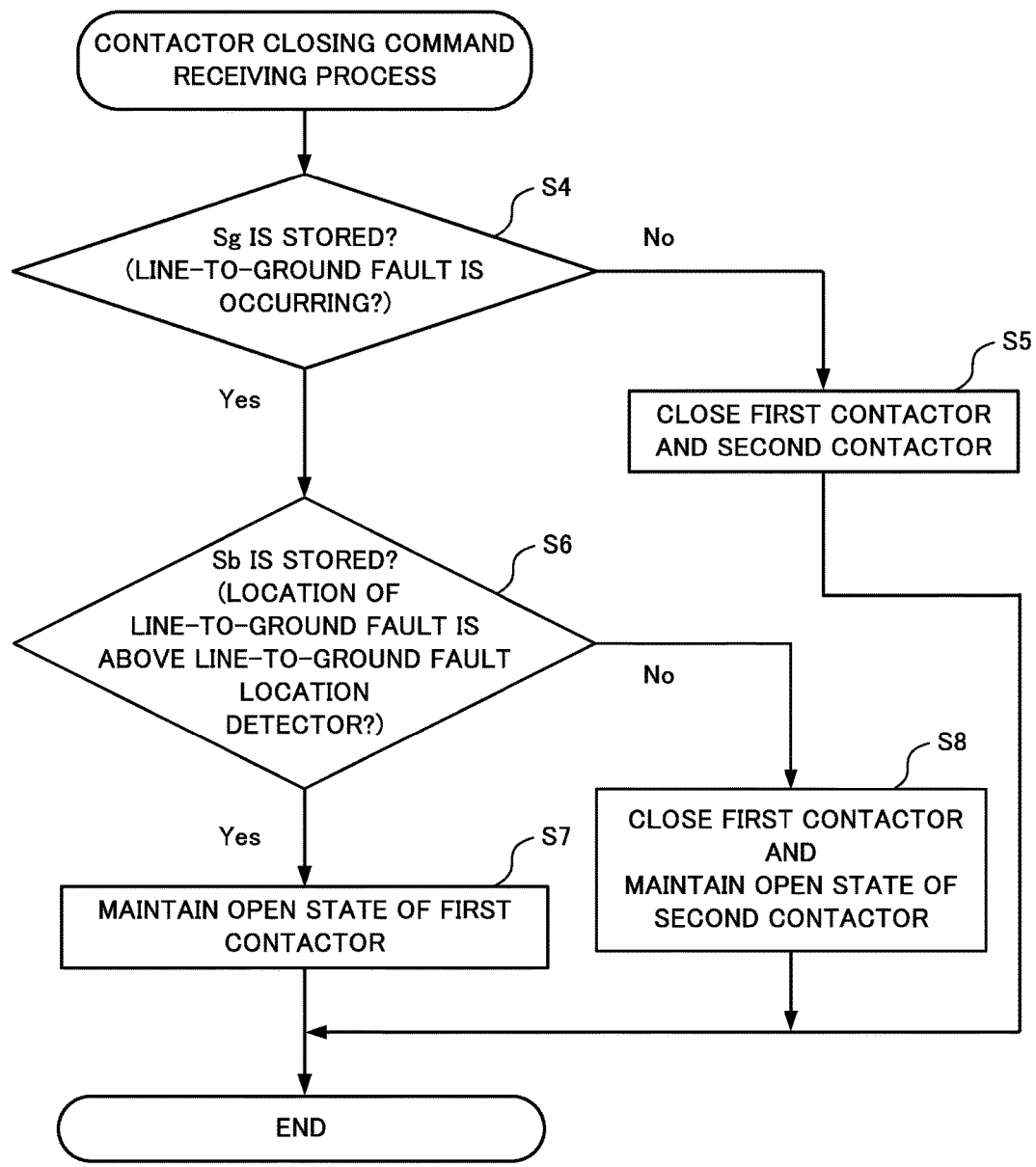
FIG. 4 is a flowchart of a contactor closing command receiving process executed by the contactor controller illustrated in FIG. 2.

In addition, when receiving the contactor closing command, the contactor controller 320 executes the contactor closing command receiving process illustrated in FIG. 4, and initially determines (step S4) whether or not the line-to-ground fault detection signal Sg is stored. When no line-to-ground fault detection signal Sg is stored (step S4; No), the contactor controller closes (step S5) the first contactor 12 and the second contactor 14, and terminates the process.

Conversely, when the line-to-ground fault detection signal Sg is stored (step S4; Yes), the contactor controller also determines (step S6) whether or not the line-to-ground fault location detection signal Sb is stored. When the line-to-ground fault location detection signal Sb is stored (step S6; Yes), the open state of the first contactor 12 is maintained (step S7) since the location of the line-to-ground fault is above the line-to-ground fault location detector 15. Conversely, when no line-to-ground fault location detection signal Sb is stored (step S6; No), the first contactor 12 is closed, and the open state of the second contactor 14 is maintained (step S8) since the location of the line-to-ground fault is below the line-to-ground fault location detector 15.

Note that the signals Sg, Sb, and the like stored in the contactor controller 320 are reset by the reset signal.

Next, the line-to-ground fault detection operation and contactor controlling operation of the power converter 10 employing the aforementioned structure will be described with specific examples.

Figure 5:
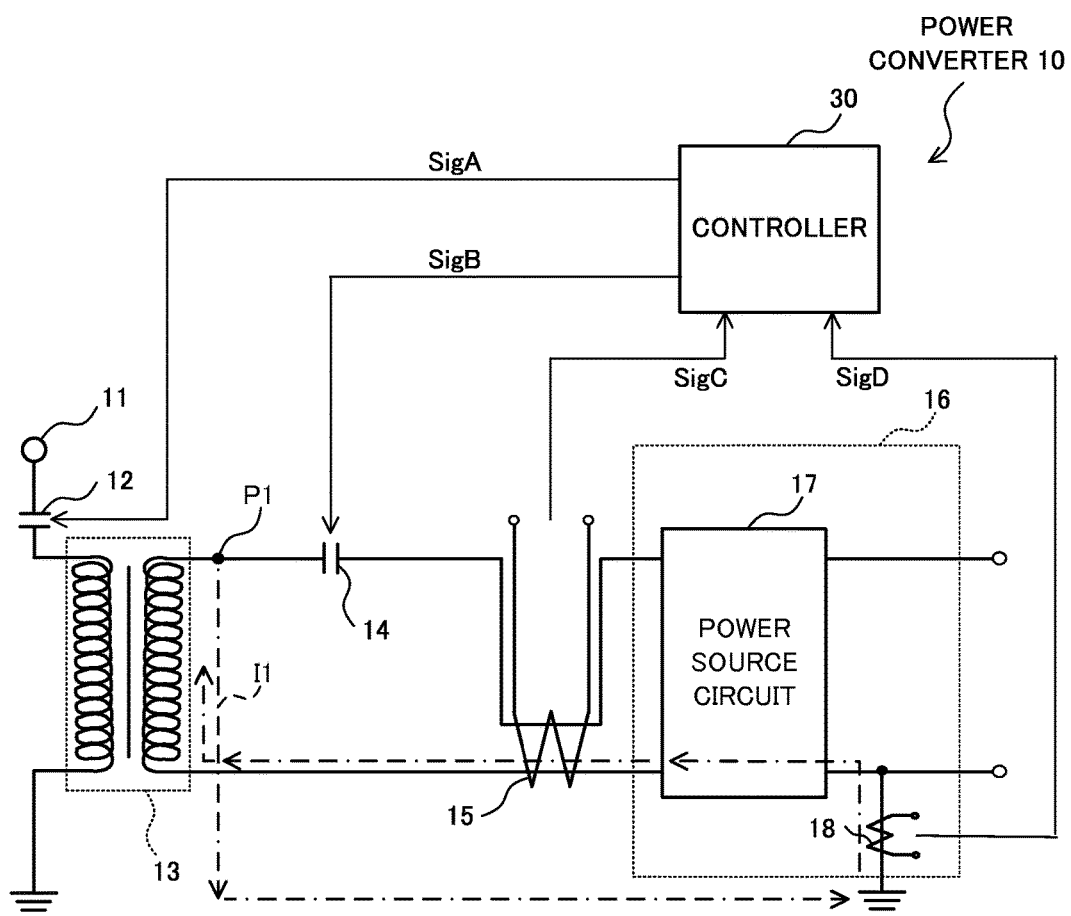
FIG. 5 is a diagram illustrating an example route of a line-to-ground fault current when a line-to-ground fault occurs at a position above a line-to-ground fault location detector.

FIG. 5 illustrates a route of a line-to-ground fault current I1 when the line-to-ground fault occurs at a point P1 in the vicinity of the one output terminal of the power transmission circuit 13. As illustrated in the figure, the line-to-ground fault current I1 flows from the point P1 to the ground, and returns, through the other output terminal of the load circuit 16, the power source circuit 17, the second electrical path, and the power transmission circuit 13, to the point P1.

At this time, the line-to-ground fault detector 18 detects this line-to-ground fault current I1, and outputs the voltage signal SigD corresponding to the magnitude of the detected line-to-ground fault current I1. In addition, the line-to-ground fault current I1 causes a difference between the current flowing through the first electrical path and the current flowing through the second electrical path. The line-to-ground fault location detector 15 detects this current difference, and outputs the voltage signal SigC that has a voltage corresponding to the detected difference.

The line-to-ground fault monitor 310 of the controller 30 outputs the line-to-ground fault detection signal Sg indicating the occurrence of the line-to-ground fault, and outputs the line-to-ground fault location detection signal Sb indicating that the location of the line-to-ground fault is above the line-to-ground fault location detector 15.

As illustrated in FIG. 3, the contactor controller 320 takes (step S1) the line-to-ground fault detection signal Sg and the line-to-ground fault location detection signal Sb.

Next, the contactor controller 320 determines that the line-to-ground fault detection signal Sg is output (step S2; Yes), and opens (step S3) the first contactor 12 and the second contactor 14. Hence, the power supply to the power converter 10 is terminated, thereby preventing a damage to the device caused by the line-to-ground fault.

Subsequently, when the user enters the contactor closing command to the contactor controller 320, the contactor controller 320 starts the process in FIG. 4, and determines whether or not the line-to-ground fault detection signal Sg is stored (step S4). In this example, because the line-to-ground fault detection signal Sg is stored (step S4; Yes), the contactor controller also determines whether or not the line-to-ground fault location detection signal Sb is stored (step S6). In this example, because the line-to-ground fault location detection signal Sb is stored (step S6; Yes), the contactor controller maintains (step S7) the first contactor 12 opened. Accordingly, the line-to-ground fault current does not flow, and the device is protected against a damage.

Figure 6:
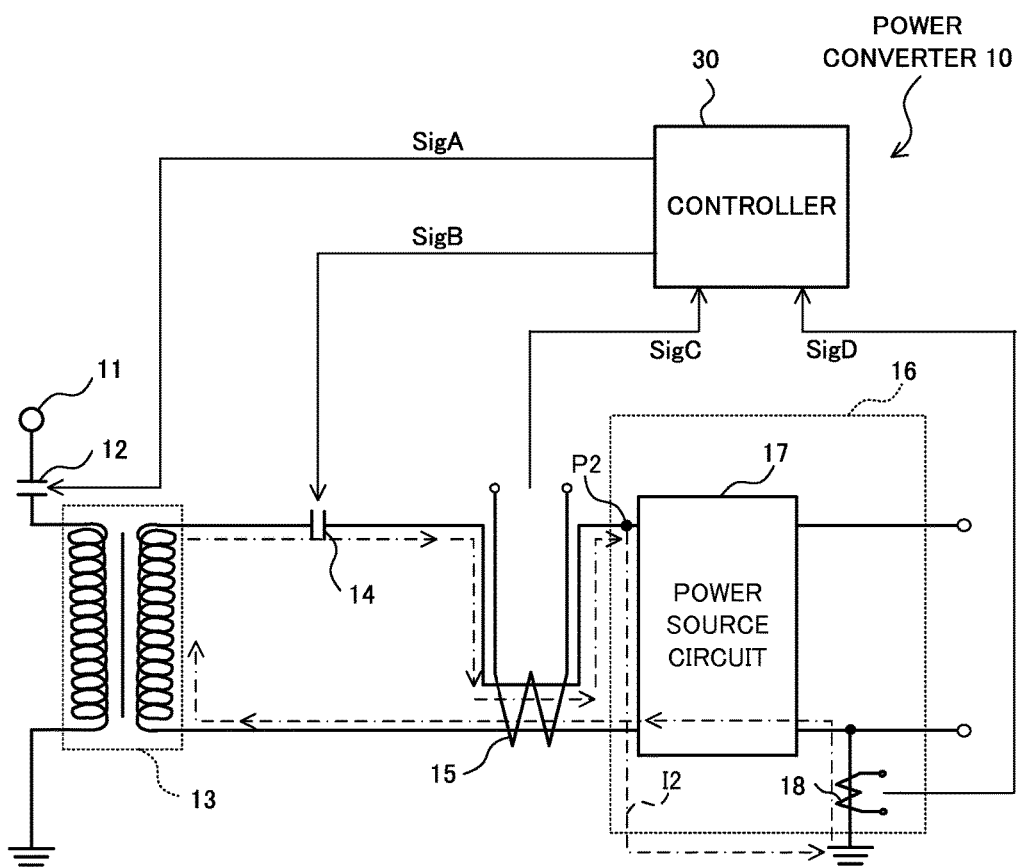
FIG. 6 is a diagram illustrating an example route of a line-to-ground fault current when a line-to-ground fault occurs at a position below the line-to-ground fault location detector.

Next, FIG. 6 illustrates a route of a line-to-ground fault current I2 when the line-to-ground fault occurs at a point P2 in the vicinity of the one input terminal of the load circuit 16. As illustrated in the figure, the line-to-ground fault current I2 flows from the point P2 to the ground, and returns, through the other output terminal of the load circuit 16, the power source circuit 17, the second electrical path, the power transmission circuit 13, and the first electrical path, to the point P2.

At this time, the line-to-ground fault detector 18 detects the line-to-ground fault current I2, and outputs the voltage signal SigD corresponding to the detected current. The line-to-ground fault current I2 flows through both first electrical path and second electrical path. Thus, the line-to-ground fault location detector 15 detects that the difference between the current flowing through the first electrical path and the current flowing through the second electrical path is substantially zero, and outputs the voltage signal SigC that has a voltage corresponding to this detected difference.

The line-to-ground fault monitor 310 of the controller 30 outputs the line-to-ground fault detection signal Sg indicating the occurrence of the line-to-ground fault, and outputs the line-to-ground fault location detection signal Sb indicating that the location of the line-to-ground fault is below the line-to-ground fault location detector 15.

As illustrated in FIG. 3, the contactor controller 320 determines that the line-to-ground fault detection signal Sg is output (step S2; Yes), and opens (step S3) the first contactor 12 and the second contactor 14. Hence, the power supply to the power converter 10 is terminated, thereby preventing a damage to the converter caused by the line-to-ground fault.

Subsequently, when the user enters the contactor closing command to the contactor controller 320, the contactor controller 320 starts the process in FIG. 4, and determines whether or not the line-to-ground fault detection signal Sg is stored (step S4). In this example, because the line-to-ground fault detection signal Sg is stored (step S4; Yes), the contactor controller determines whether or not the line-to-ground fault location detection signal Sb is stored (step S6). In this example, because the line-to-ground fault location detection signal Sb is not stored (step S6; No), the first contactor 12 is closed, and the open state of the second contactor 14 is maintained (step S8). Hence, in the case in which circuits other than the load circuit 16 are connected to the power transmission circuit 13, power is supplied to those circuits other than the load circuit 16 after preventing an occurrence of the line-to-ground fault current.

As explained above, the power converter 10 according to Embodiment 1 detects the location of the line-to-ground fault, and opens the first contactor 12 and the second contactor 14. Subsequently, when the contactor closing command is entered, the closing and opening of the first contactor 12 and those of the second contactor 14 are controlled in accordance with the detected location of the line-to-ground fault so as not to allow the line-to-ground fault to occur. Thus, the first contactor 12 and the second contactor 14 break the line-to-ground fault current, thereby preventing a damage to the device and to the circuits. As for the contactor that controls the making and breaking of the current between the power transmission circuit 13 and the load circuit 16, it only needs to provide the second contactor 14, and thus the device can be downsized. Furthermore, when the line-to-ground fault occurs at a position below the line-to-ground fault location detector 15, power can be continuously supplied to normal circuits with no occurrence of line-to-ground fault by resuming the power supply to the power transmission circuit 13.

(Modified Examples)

In the discussion above, the process in FIG. 4 was executed when the contactor closing command was entered, but the first contactor 12 may be opened (the second contactor 14 may be either opened or kept closed) when both of the line-to-ground fault detection signal Sg and the line-to-ground fault location detection signal Sb are stored (when the location of the line-to-ground fault is above the line-to-ground fault location detector 15), and only the second contactor 14 may be opened when the line-to-ground fault detection signal Sg is stored but the line-to-ground fault location detection signal Sb is not stored (when the location of the line-to-ground fault is below the line-to-ground fault location detector 15).

The voltage signals are the form of signal for the line-to-ground fault location detection signal SigC, and the line-to-ground fault detection signal SigD, but these signals may be current signals or digital signals.

A position of the line-to-ground fault location detector 15 is optional as long as the difference between the current flowing through the first electrical path and the current flowing through the second electrical path can be obtained. For example, the line-to-ground fault location detector can be disposed between the power transmission circuit 13 and the second contactor 14. However, it is desirable that the line-to-ground fault location detector should be disposed in the vicinity of the second contactor 14.

The line-to-ground fault location detector 15 is not limited to the Hall element, the current transformer, and the like, and any structure is applicable as long as the difference between the current flowing through the first electrical path and the current flowing through the second electrical path can be detected. In addition, the line-to-ground fault detector 18 is not limited to the Hall element, the current transformer, and the like, and any structure is applicable as long as the line-to-ground fault current can be detected.

The structure of the controller 30 is also optional as long as the similar functions can be realized.

(Embodiment 2)

As is suggested in Embodiment 1, the power transmission circuit 13 can be connected with multiple load circuits. In addition, the second contactor 14, the line-to-ground fault location detector 15, the line-to-ground fault detector 18, and the like can be disposed for each load circuit.

A power converter 20 including the second contactor 14, the line-to-ground fault location detector 15, the line-to-ground fault detector 18, and the like, which are disposed for each load circuit is explained below.

Figure 7:
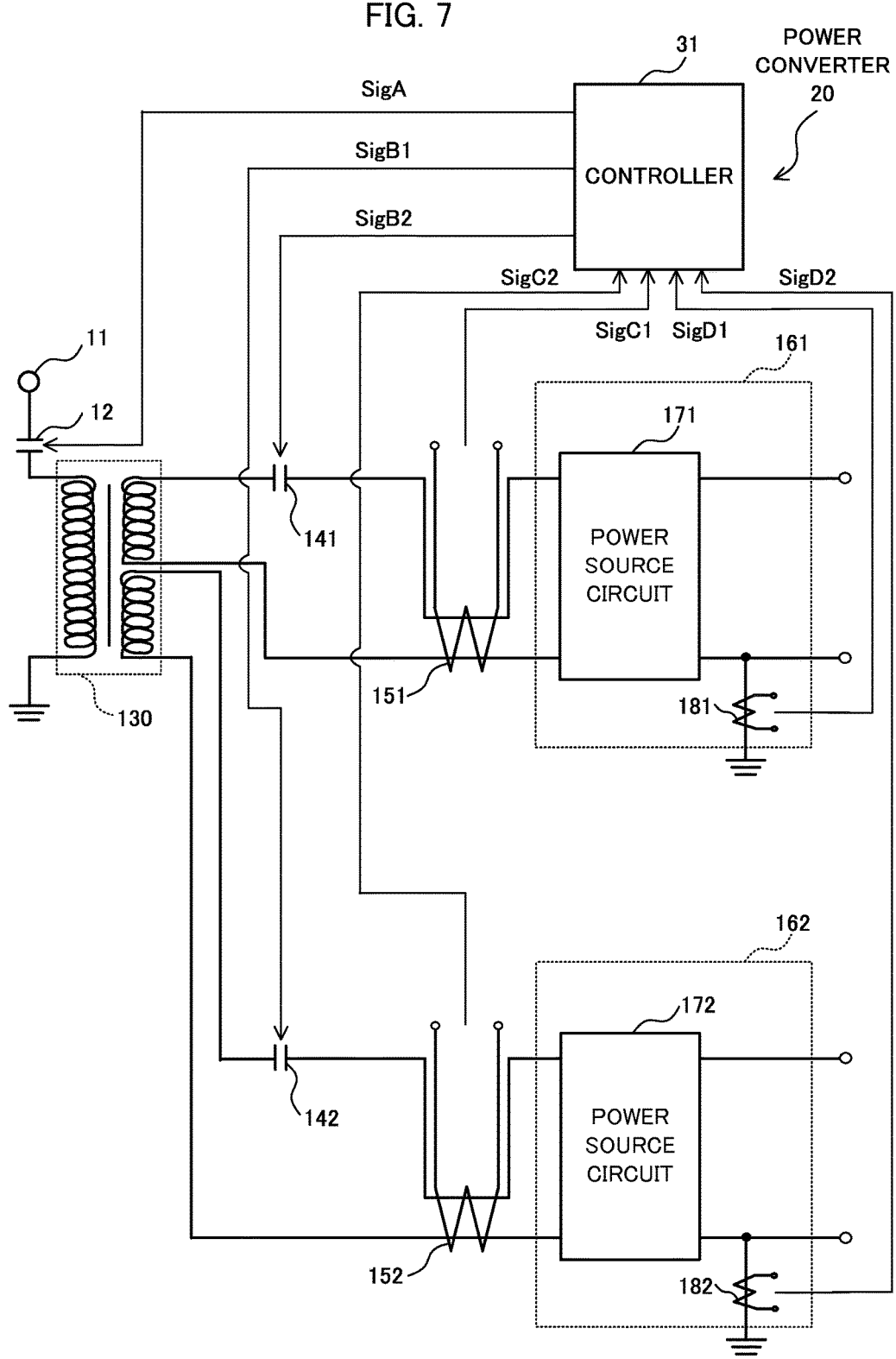
FIG. 7 is a structural diagram illustrating a power converter including two load circuits.

As illustrated in FIG. 7, the power converter 20 of Embodiment 2 includes multiple pairs of output terminals in a power transmission circuit 130. For example, the power transmission circuit 130 includes a transformer having two secondary windings.

The second contactor 14, the line-to-ground fault location detector 15, and the load circuit 16 are disposed for each pair of output terminals in the power transmission circuit 130.

In the following explanation, a set of the second contactor 14, the line-to-ground fault location detector 15, and the load circuit 16 will be referred to as a first system or a second system. In addition, for the purpose of distinction, a notation i (1 or 2) is added at the end of the reference numeral.

Accordingly, a circuit of an i-th system includes a second contactor 14i, a line-to-ground fault location detector 15i, and a load circuit 16i, and is connected with an i-th output terminal of the power transmission circuit 130.

The line-to-ground fault location detector 15i outputs a voltage signal SigCi to a controller 31, and the line-to-ground fault detector 18i outputs a voltage signal SigDi to the controller 31.

Figure 8:
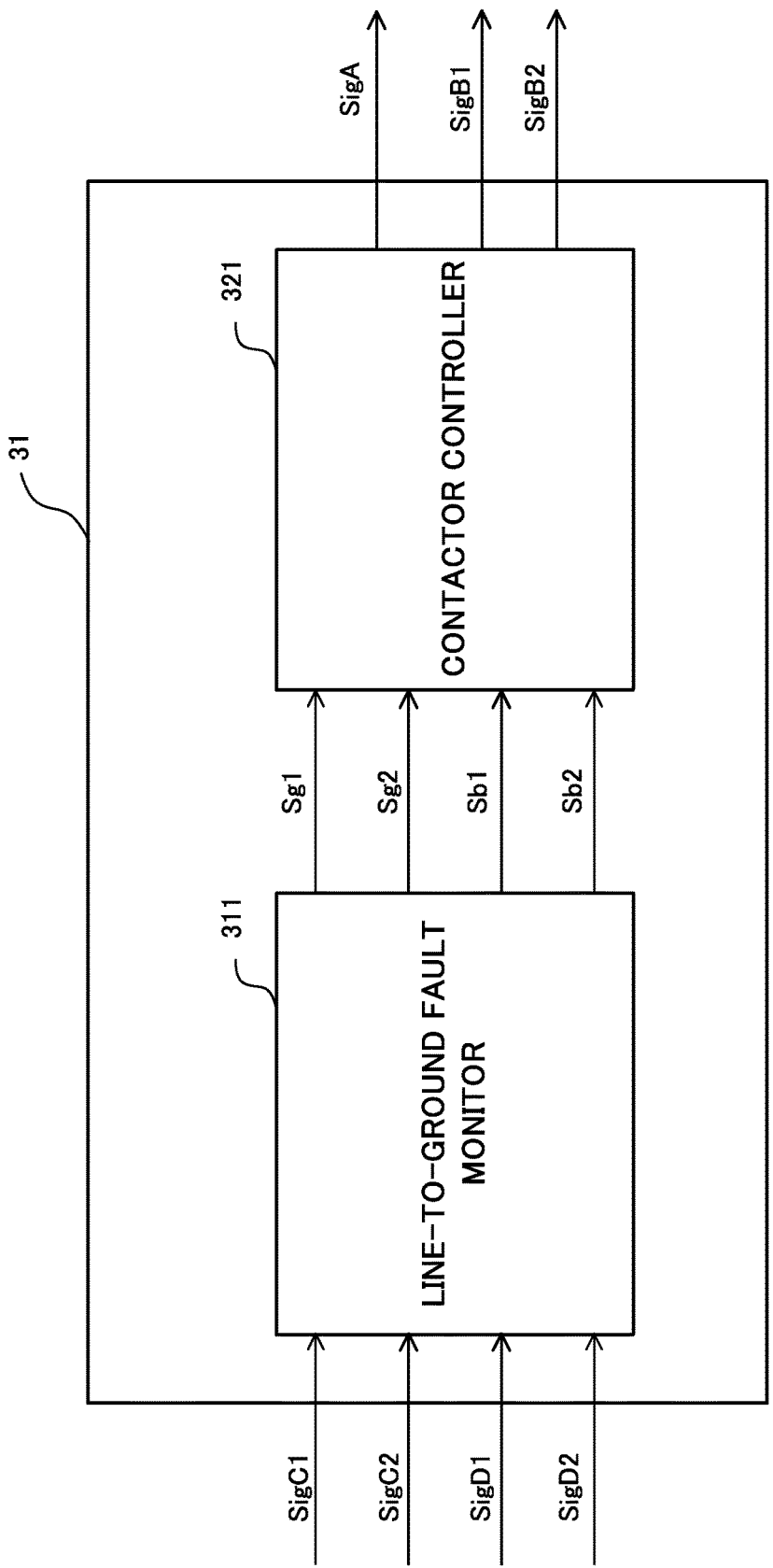
FIG. 8 is a structural diagram of a controller illustrated in FIG. 7.

As illustrated in FIG. 8, the controller 31 includes a line-to-ground fault monitor 311 and a contactor controller 321.

The line-to-ground fault monitor 311 outputs a line-to-ground fault detection signal Sgi when a voltage of the voltage signal SigDi is equal to or greater than a first threshold value for the i-th system. In addition, the line-to-ground fault monitor 311 outputs a line-to-ground fault location detection signal Sbi when a voltage of the voltage signal SigCi is equal to or greater than a second threshold value for the i-th system.

Figure 9:
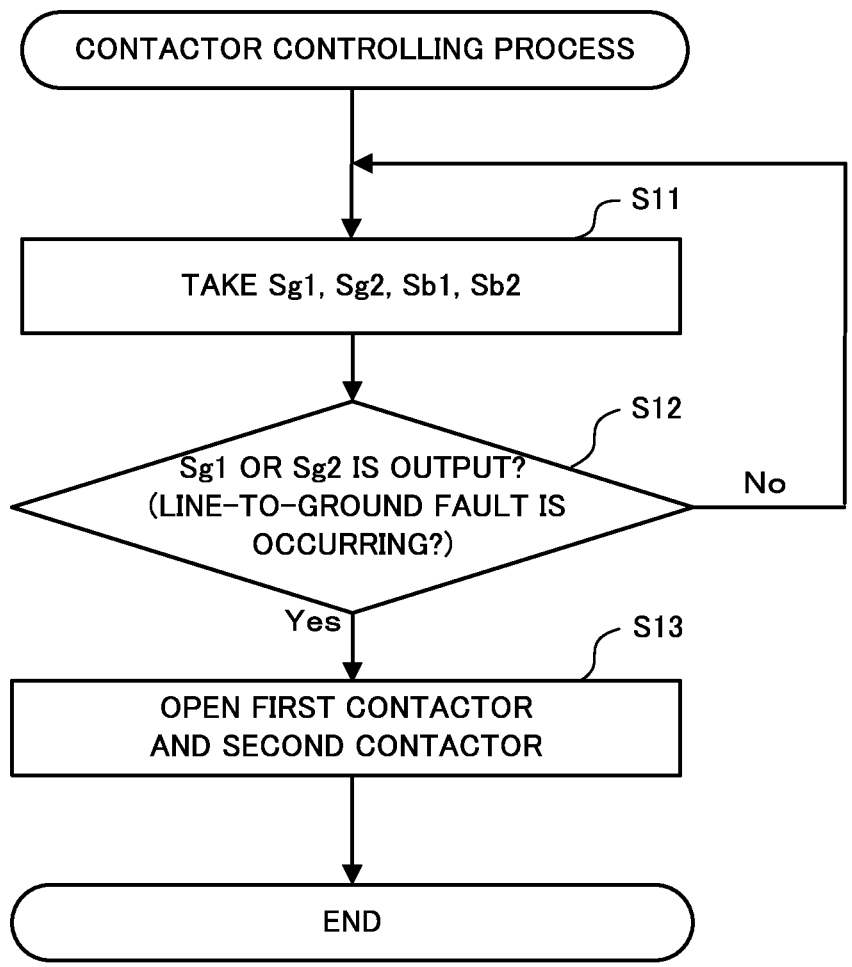
FIG. 9 is a flowchart of a contactor controlling process executed by a contactor controller illustrated in FIG. 8.

As illustrated in FIG. 9, the contactor controller 321 periodically takes (step S11) signals Sgi (Sg1, Sg2) and Sbi (Sb1, Sb2), and stores these signals.

The contactor controller 321 determines (step S12) whether or not the line-to-ground fault detection signal Sg1 or the line-to-ground fault detection signal Sg2 is output. When neither the line-to-ground fault detection signal Sg1 or the line-to-ground fault detection signal Sg2 is output (step S12; No), the process returns to the step S11.

Conversely, when the line-to-ground fault detection signal Sg1 or the line-to-ground fault detection signal Sg2 is output (step S12; Yes), the contactor controller 321 opens (step S13) the first contactor 12 and the second contactors 141 and 142 because the line-to-ground fault is occurring, and thus a damage to the device caused by the line-to-ground fault current can be prevented.

Figure 10:
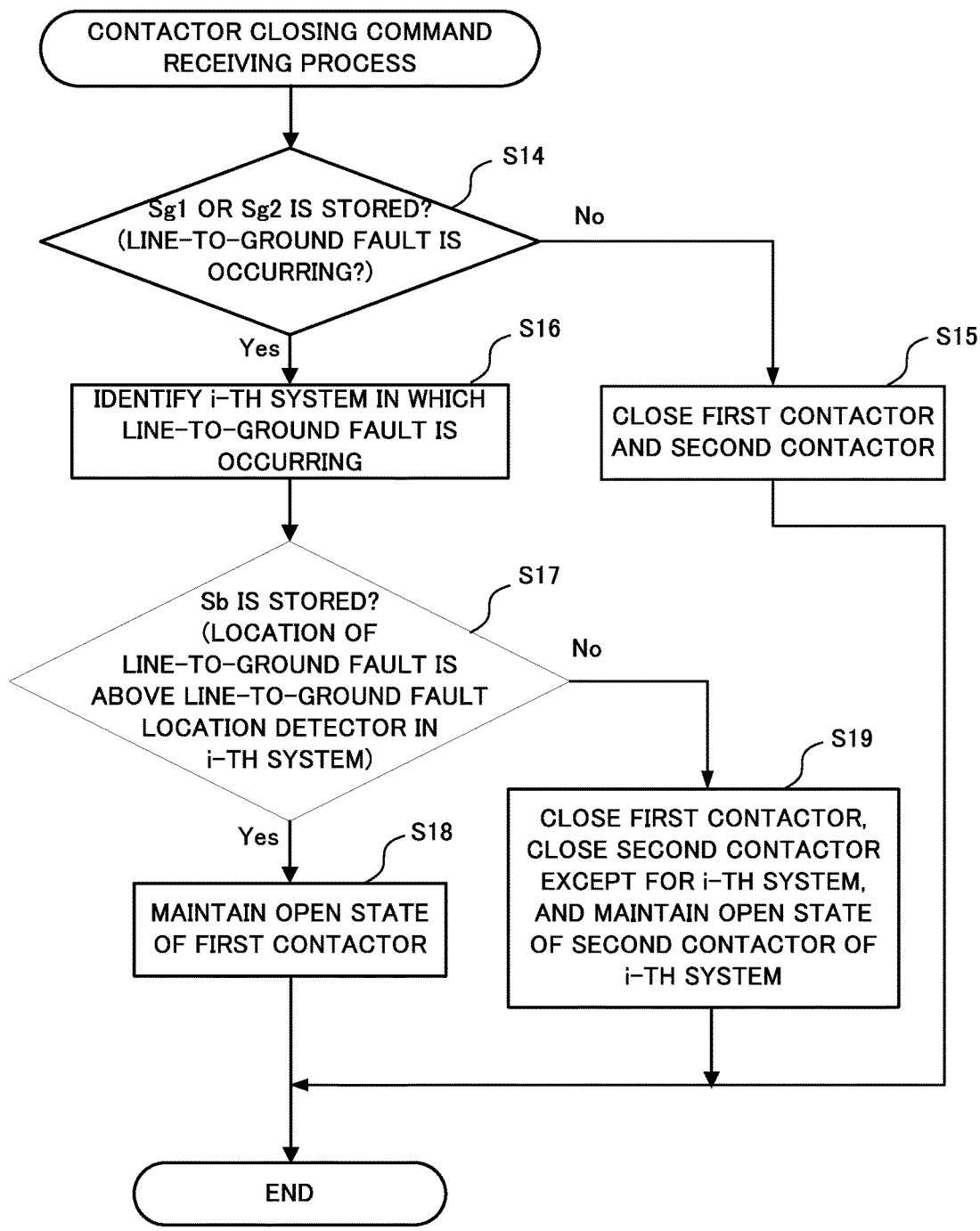
FIG. 10 is a flowchart of a contactor closing command receiving process executed by the contactor controller illustrated in FIG. 8.

When the contactor closing command is provided, the contactor controller 321 determines, as illustrated in FIG. 10, whether or not the line-to-ground fault occurs based on whether or not the line-to-ground fault detection signal Sg1 or the line-to-ground fault detection signal Sg2 is stored (step S14). When determining that there is no occurrence of line-to-ground fault (step S14; No), the contactor controller closes (step S15) the first contactor 12 and the second contactors 141 and 142.

Conversely, when either the line-to-ground fault detection signal Sg1 or the line-to-ground fault detection signal Sg2 is stored (step S14; Yes), the contactor controller determines (step S16) the i-th system in which the line-to-ground fault occurs. When the line-to-ground fault detection signal Sgi is stored, the contactor controller determines (step S16) that the line-to-ground fault occurs in the i-th system.

Next, the contactor controller 321 determines (step S17) whether or not the line-to-ground fault location detection signal Sbi is stored.

When the line-to-ground fault location detection signal Sbi is stored (step S17; Yes), the line-to-ground fault occurs in the i-th system, and the location of the line-to-ground fault is above the line-to-ground fault location detector 15i.

Hence, the contactor controller 321 maintains (step S18) the open state of the first contactor 12.

Conversely, when the line-to-ground fault location detection signal Sbi is not output (step S17; No), the line-to-ground fault occurs in the i-th system, and the location of the line-to-ground fault is below the line-to-ground fault location detector 15i. Accordingly, the contactor controller 321 closes the first contactor 12 by a control signal SigA while maintaining the open state of a second contactor 14i. Subsequently, the second contactor 14j is closed by a control signal SigBj (j≠i), and power is supplied to the circuits that have no occurrence of the line-to-ground fault (step S19).

According to the power converter 20 employing the aforementioned structure, when the line-to-ground fault occurs at a position above the line-to-ground fault location detector 15i of any one of the systems, the power supply to the power transmission circuit 130 is terminated, and thus a damage to the device can be prevented. When the contactor closing command is entered in this condition, and when the line-to-ground fault occurs at a position below the line-to-ground fault location detector 15i in the i-th system, the power supply from the power transmission circuit 130 to the i-th system is terminated, but the power is continuously supplied to the other systems, and thus the other systems can continuously operate. The contactors necessary for this power converter 20 are simply the first contactor 12 and the second contactors 14 by which corresponds to the number of systems. Hence, according to the power converter 20, the device can be downsized.

Note that the number of systems is not limited to two, and may be equal to or greater than three. In addition, the second contactor 14 need not be disposed for all systems, and the second contactors 14 may be disposed for only some of the systems.

In the operation of the contactor controller 321 illustrated in FIG. 8, when the occurrence of the line-to-ground fault is detected in the step S12, the contactor controller may execute the process in the step S17 and the subsequent process in FIG. 10 instead of opening the first contactor 12 and the second contactor 14.

(Embodiment 3)

Situations where the power converters according to Embodiment 1 and Embodiment 2 are applied are optional. Embodiment 3 that is an example case in which the power converter 10 as illustrated in FIG. 1 is applied to an electric motor car is explained below.

Figure 11:
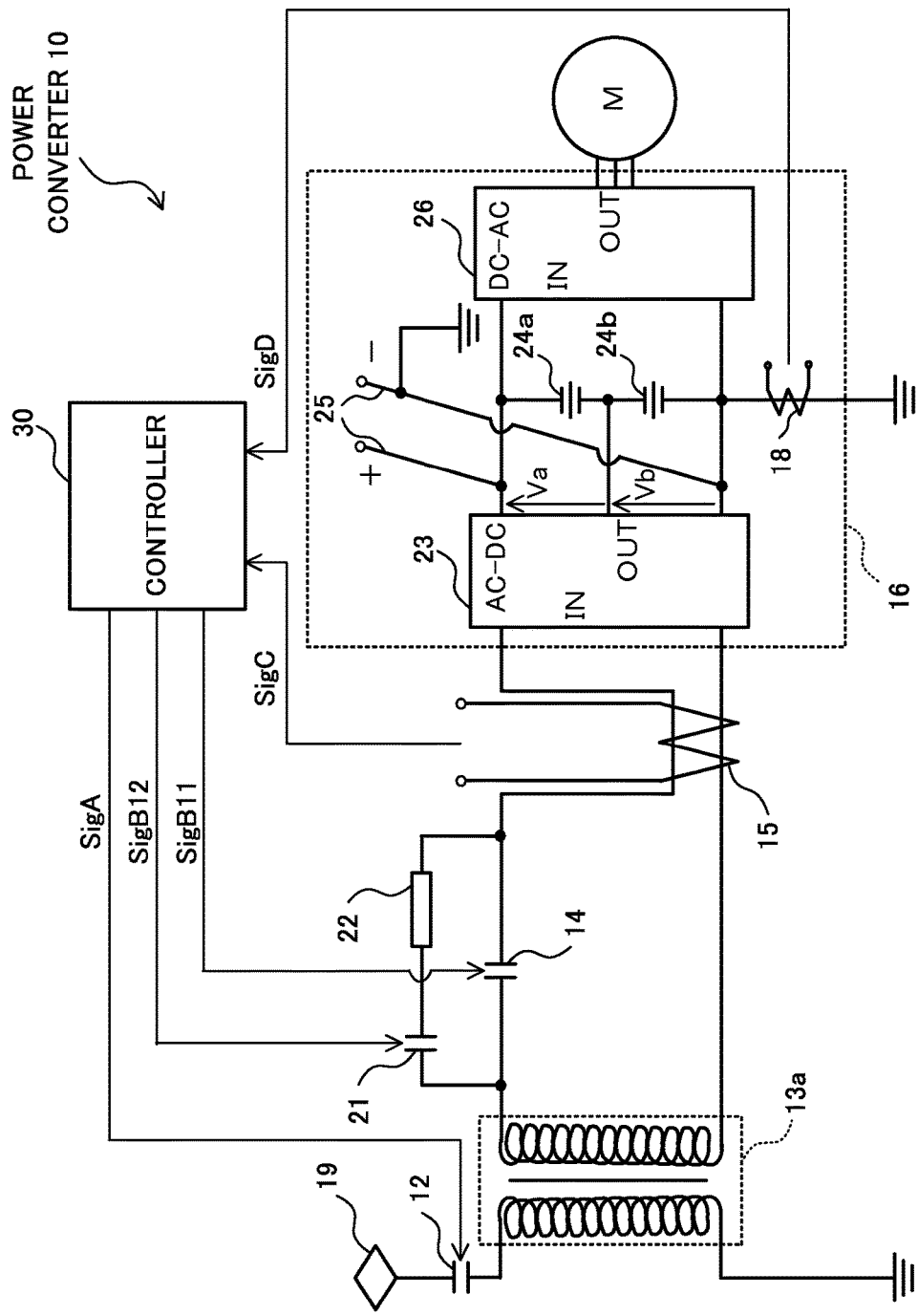
FIG. 11 is a structural diagram when a power converter according to Embodiment of the present disclosure is loaded on an electric motor car.

The power converter 10 of Embodiment 3 includes, as illustrated in FIG. 11, a pantograph 19 that corresponds to the current input terminal 11, the first contactor 12, a transformer 13a that corresponds to the power transmission circuit 13, the second contactor 14, the line-to-ground fault location detector 15, the load circuit 16, a third contactor 21, a resistor 22, and the controller 30.

The load circuit 16 includes the line-to-ground fault detector 18, an AC-DC converter 23, a first filter capacitor 24a, a second filter capacitor 24b, a DC voltage application terminal 25, and a DC-AC converter 26.

The pantograph 19 is attached to a roof of an electric motor car. The pantograph 19 allows an AC current supplied from an overhead line to flow to the first contactor 12.

The first contactor 12 switches a state in accordance with the control signal SigA that is output by the controller 30. When the first contactor 12 becomes the open state, the first contactor breaks the AC current supplied from the overhead line. Conversely, when the first contactor 12 becomes the closed state, the first contactor allows the AC current supplied from the overhead line to flow to the primary winding of the transformer 13a.

One end of the first contactor 12 is connected with the pantograph 19, and the other end of the first contactor 12 is connected with one end of the primary winding of the transformer 13a.

The transformer 13a is an insulation type. The transformer 13a transforms the voltage applied to the primary winding, and outputs the transformed voltage from the secondary winding.

The one end of the primary winding of the transformer 13a is connected with the other end of the first contactor 12. The other end of the primary winding of the transformer 13a is grounded. In addition, the one end of the secondary winding of the transformer 13a is connected with both of the one end of the second contactor 14 and the one end of the third contactor 21. The other end of the secondary winding of the transformer 13a is connected with the other input terminal of the AC-DC converter 23.

The second contactor 14 switches a state in accordance with a control signal SigB11 that is output by the controller 30. When the second contactor 14 becomes the open state, the second contactor breaks the current which is output from the one terminal of the secondary winding of the transformer 13a, and which flows to one input terminal of the AC-DC converter 23.

When the second contactor 14 becomes the closed state, the second contactor allows the AC current that is output by the one end of the secondary winding of the transformer 13a to flow to the one input terminal of the AC-DC converter 23.

The one end of the second contactor 14 is connected with both of the one end of the third contactor 21 and the one end of the secondary winding of the transformer 13a. In addition, the other end of the second contactor 14 is connected with both of the other end of the resistor 22 and the one input terminal of the AC-DC converter 23.

The third contactor 21 switches a state in accordance with a control signal SigB12 that is output by the controller 30. When the third contactor 21 becomes the open state, the third contactor breaks the AC current flowing to the resistor 22. In addition, when the third contactor 21 becomes the open state, the third contactor breaks the current flowing to the resistor 22. Still further, when the third contactor 21 becomes the closed state, the third contactor allows the AC current to flow to the resistor 22.

The one end of the third contactor 21 is connected with the one end of the secondary winding of the transformer 13a, and the other end of the third contactor 21 is connected with the one end of the resistor 22.

The resistor 22 limits an amplitude of the AC current flowing through the third contactor 21.

The one end of the resistor 22 is connected with the other end of the third contactor 21. The other end of the resistor 22 is connected with both of the other end of the second contactor 14 and the one input terminal of the AC-DC converter 23.

The line-to-ground fault location detector 15 is a sensor that enables the controller 30 to detect, when the line-to-ground fault occurs, whether the location of the line-to-ground fault that is occurring is above the line-to-ground fault location detector 15 or below there.

The line-to-ground fault location detector 15 includes, for example, a Hall element. The line-to-ground fault location detector 15 detects a difference between the current flowing through a conducting wire that connects the other end of the resistor 22, the other end of the second contactor 14, and the one input terminal of the AC-DC converter 23, and, the current flowing through a conducting wire that connects the other end of the secondary winding in the transformer 13a, and the other input terminal of the AC-DC converter 23. The line-to-ground fault location detector 15 outputs, to the controller 30, the voltage signal SigC indicating a voltage that corresponds to the detected current difference.

The AC-DC converter 23 converts an AC voltage transmitted to the input terminal to a DC voltage, and outputs the converted DC voltage from the output terminal including first to third terminals. The one input terminal of the AC-DC converter 23 is connected with both of the other end of the second contactor 14, and the other end of the resistor 22. In addition, the other input terminal of the AC-DC converter 23 is connected with the other end of the secondary winding of the transformer 13a.

The first terminal in the output terminal of the AC-DC converter 23 is connected with a positive terminal of the DC voltage application terminal 25, one end of the first filter capacitor 24a, and the one input terminal of the DC-AC converter 26. The second terminal in the output terminal of the AC-DC converter 23 is connected with both of the other end of the first filter capacitor 24a, and one end of the second filter capacitor 24b. Furthermore, the third terminal in the output terminal of the AC-DC converter 23 is connected with a negative terminal of the DC voltage application terminal 25, the other end of the second filter capacitor 24b, and the other input terminal of the DC-AC converter 26.

When, for example, an AC voltage with an effective voltage of 1700 volts (V) is applied to the input terminal, the AC-DC converter 23 outputs a DC voltage Va of 1650 V from the first terminal-second terminal, and outputs a DC voltage Vb of 1650 V from the second terminal-third terminal.

A series circuit constructed by the first filter capacitor 24a and the second filter capacitor 24b is charged by the DC voltage that is output from the output terminals of the AC-DC converter 23. As a consequence of this charging, the series circuit constructed by the first filter capacitor 24a and the second filter capacitor 24b smoothens the DC voltage applied to the input terminal of the DC-AC converter 26.

The series circuit constructed by the first filter capacitor 24a and the second filter capacitor 24b is connected with the output terminal of the AC-DC converter 23, and the DC voltage application terminal 25, and the input terminal of the DC-AC converter 26.

More specifically, the one end of the first filter capacitor 24a is connected with the first terminal of the AC-DC converter 23, the positive terminal of the DC voltage application terminal 25, and the one input terminal of the DC-AC converter 26. In addition, the other end of the first filter capacitor 24a is connected with the second terminal of the AC-DC converter 23, and the one end of the second filter capacitor 24b.

Still further, the other end of the second filter capacitor 24b is connected with the third terminal of the AC-DC converter 23, the negative terminal of the DC voltage application terminal 25, and the other input terminal of the DC-AC converter 26.

Figure 12:
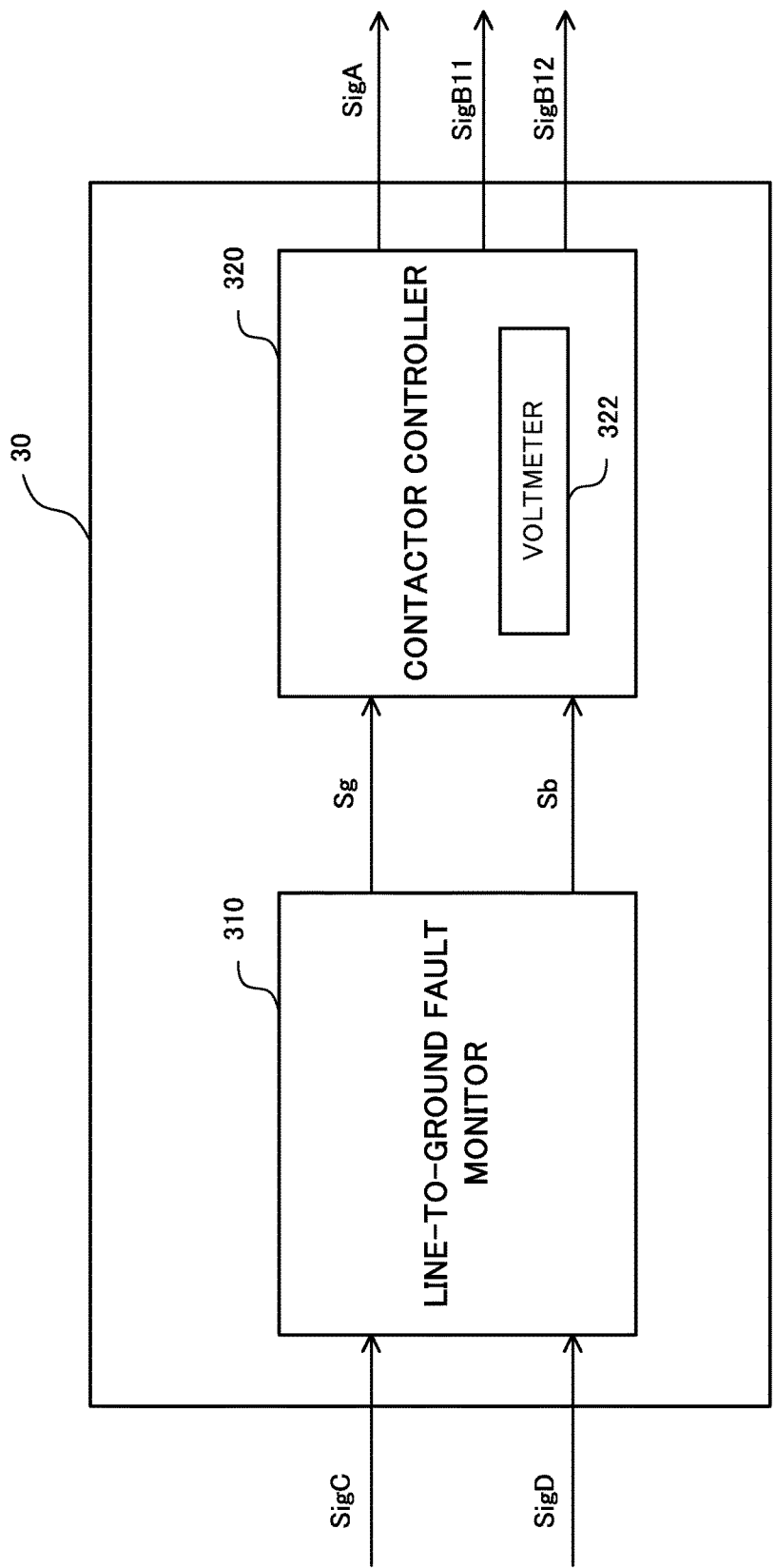
FIG. 12 is a block diagram of a controller illustrated in FIG. 11.

At this time, when the first contactor 12 is in the closed state, and information indicating that the voltage of the first filter capacitor 24a and that of the second filter capacitor 24b are smaller than a threshold value is output by a voltmeter 322 (an instrument for measuring voltages of the filter capacitors 24a and 24b, see FIG. 12), the controller 30 outputs the control signal SigB12 that closes the third contactor 21. In addition, the controller 30 outputs the control signal SigB11 that opens the second contactor 14.

Hence, the AC current flowing through the second contactor 14 is broken, and the AC current that has the amplitude limited by the resistor 22 flows in the one input terminal of the AC-DC converter 23. Thus, during the initial charging of the first filter capacitor 24a and the second filter capacitor 24b, the current flowing in the filter capacitors 24a and 24b can be limited by the resistor 22.

As illustrated in FIG. 12, the controller 30 includes the line-to-ground fault monitor 310 and the contactor controller 320. The contactor controller 320 includes the voltmeter 322 that measures voltages of the filter capacitors 24a and 24b. When the first contactor 12 is in the closed state, and the voltages of the filter capacitors 24a and 24b measured by the voltmeter 322 are equal to or greater than the threshold value, the controller 30 outputs the control signal SigB12 that opens the third contactor 21, and further outputs the control signal SigB11 that closes the second contactor 14. Thus, the current flowing through the third contactor 21 and the resistor 22 is broken, and the output current from the transformer 13a flows in the AC-DC converter 23 via the second contactor 14.

The resistor 22 limits the amplitude of the current flowing through the third contactor 21. Conversely, the amplitude of the current flowing through the second contactor 14 is not limited by the resistor 22. Thus, the third contactor 21 can decrease an allowable value of current to be a smaller value than the allowable value of current for the second contactor 14 that does not limit the amplitude of current by the resistor 22. Hence the third contactor 21 can be downsized that is smaller than the second contactor 14.

The line-to-ground fault detector 18 is a sensor that enables the controller 30 to detect the occurrence of the line-to-ground fault when the line-to-ground fault occurs in the power converter 10 and when the first contactor 12 is in the closed state (when the electric motor car is located in an AC power territory).

The line-to-ground fault detector 18 includes, for example, a Hall element. The line-to-ground fault detector 18 detects the line-to-ground fault current that flows through the conducting wire connecting a node between the first filter capacitor 24a and the second filter capacitor 24b with the ground. The line-to-ground fault detector 18 outputs, to the controller 30, the voltage signal SigD that indicates a value corresponding to the magnitude of the line-to-ground fault current.

The DC voltage application terminal 25 has the DC voltage applied thereto and supplied from the overhead line when the electric motor car is present in the DC power territory. A positive potential of the DC voltage supplied from the overhead line is applied to the positive terminal. A negative potential of the DC voltage supplied from the overhead line (a potential already grounded when the DC voltage is supplied) is applied to the negative terminal. This negative terminal is grounded.

The DC-AC converter 26 converts the DC power that is input to the input terminal to the AC power, and outputs the AC power from the output terminal. The one input terminal of the DC-AC converter 26 is connected with the first terminal of the AC-DC converter 23, the one end of the first filter capacitor 24a, and the positive terminal of the DC voltage application terminal 25. In addition, the other input terminal of the DC-AC converter 26 is connected with the third terminal of the AC-DC converter 23, the other end of the second filter capacitor 24b, and the negative terminal of the DC voltage application terminal 25. Still further, output terminals of the DC-AC converter 26 are connected with, for example, an AC motor M.

Figure 13:
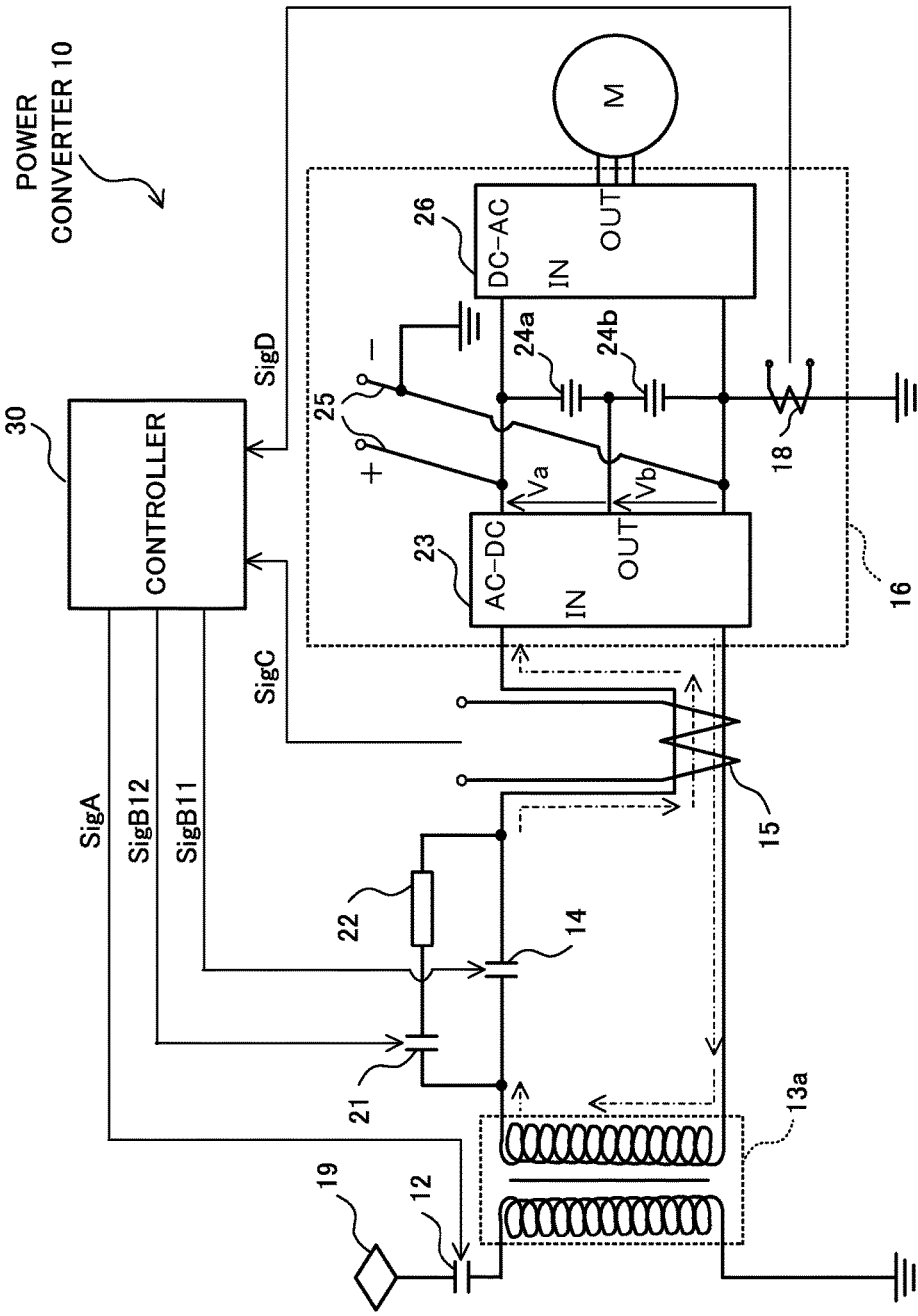
FIG. 13 is a diagram illustrating an example route of a current in a steady state.

The operation of the aforementioned power converter 10 when there is no occurrence of the line-to-ground fault (steady state) is described with reference to FIG. 13.

An example case in which the first contactor 12 is closed when the electric motor car is present in the AC power territory is explained.

In this case, when the third contactor 21 is in the closed state, and the second contactor 14 is in the open state, a current flows from the transformer 13a through the third contactor 21 and the resistor 22, and flows to the AC-DC converter 23. Conversely, when the third contactor 21 is in the open state and the second contactor 14 is in the closed state, the current flows from the transformer 13a through the second contactor 14, and flows to the AC-DC converter 23.

The AC-DC converter 23 rectifies the AC power that is supplied from the transformer 13a, and outputs the DC voltage across the first terminal and the third terminal of the AC-DC converter. The first filter capacitor 24a and the second filter capacitor 24b are charged by this DC voltage. The DC voltage that is stabilized by the first filter capacitor 24a and the second filter capacitor 24b is converted to a three-phase AC voltage by the DC-AC converter 26, and is supplied to the AC motor M. Hence, the AC motor M rotates, and the electric motor car is driven.

In this case, the current flowing through the line-to-ground fault location detector 15, more specifically, the current flowing between the one output terminal of the transformer 13a and the one input terminal of the AC-DC converter 23, and the current flowing between the other output terminal of the transformer 13a and the other input terminal of the AC-DC converter 23 have opposite flow directions but show the same current value. Thus, the current difference is not detected by the line-to-ground fault location detector 15, and the voltage signal SigC becomes substantially 0 V.

In addition, no line-to-ground fault current is detected by the line-to-ground fault detector 18 because no current flows through the line-to-ground fault detector 18. Thus, the voltage signal SigD also becomes substantially 0 V.

Note that when the DC voltage is applied to the DC voltage application terminal 25, the second contactor 14 and the third contactor 21 becomes the open state. Thus, the DC current that flows from the positive terminal of the DC voltage application terminal 25 flows to the one input terminal of the DC-AC converter 26. Subsequently, the DC current is output from the other input terminal of the DC-AC converter 26, and flows to the negative terminal of the DC voltage application terminal 25.

Next, the operation of the power converter 10 when the line-to-ground fault occurs is explained.

Figure 14:
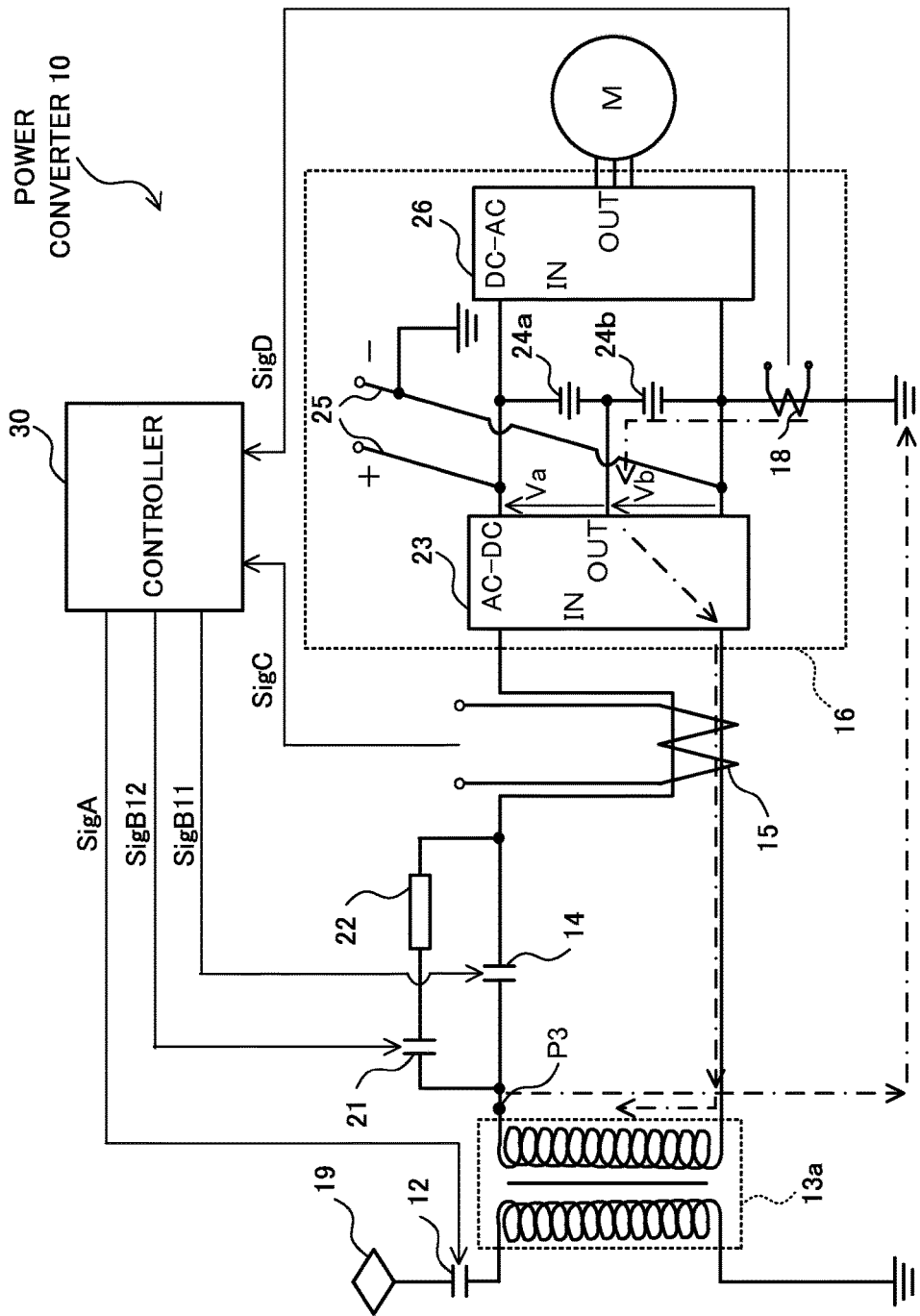
FIG. 14 is a diagram illustrating an example route of a line-to-ground fault current when a line-to-ground fault occurs at a position above the line-to-ground fault location detector.

When the line-to-ground fault occurs at a point P3 that is above the line-to-ground fault location detector 15 while there is the electric motor car in the AC power territory, and the first contactor 12 is in the closed state, the line-to-ground fault current flows in sequence, as illustrated in FIG. 14, through the point of line-to-ground fault P3→the ground→the line-to-ground fault detector 18→the second filter capacitor 24b→the second terminal of the AC-DC converter 23→the other input terminal of the AC-DC converter 23→the line-to-ground fault location detector 15→the other end of the secondary winding of the transformer 13a→the point of line-to-ground fault P3.

Thus, the line-to-ground fault detector 18 detects the line-to-ground fault current. The line-to-ground fault location detector 15 detects the current difference.

Figure 15:
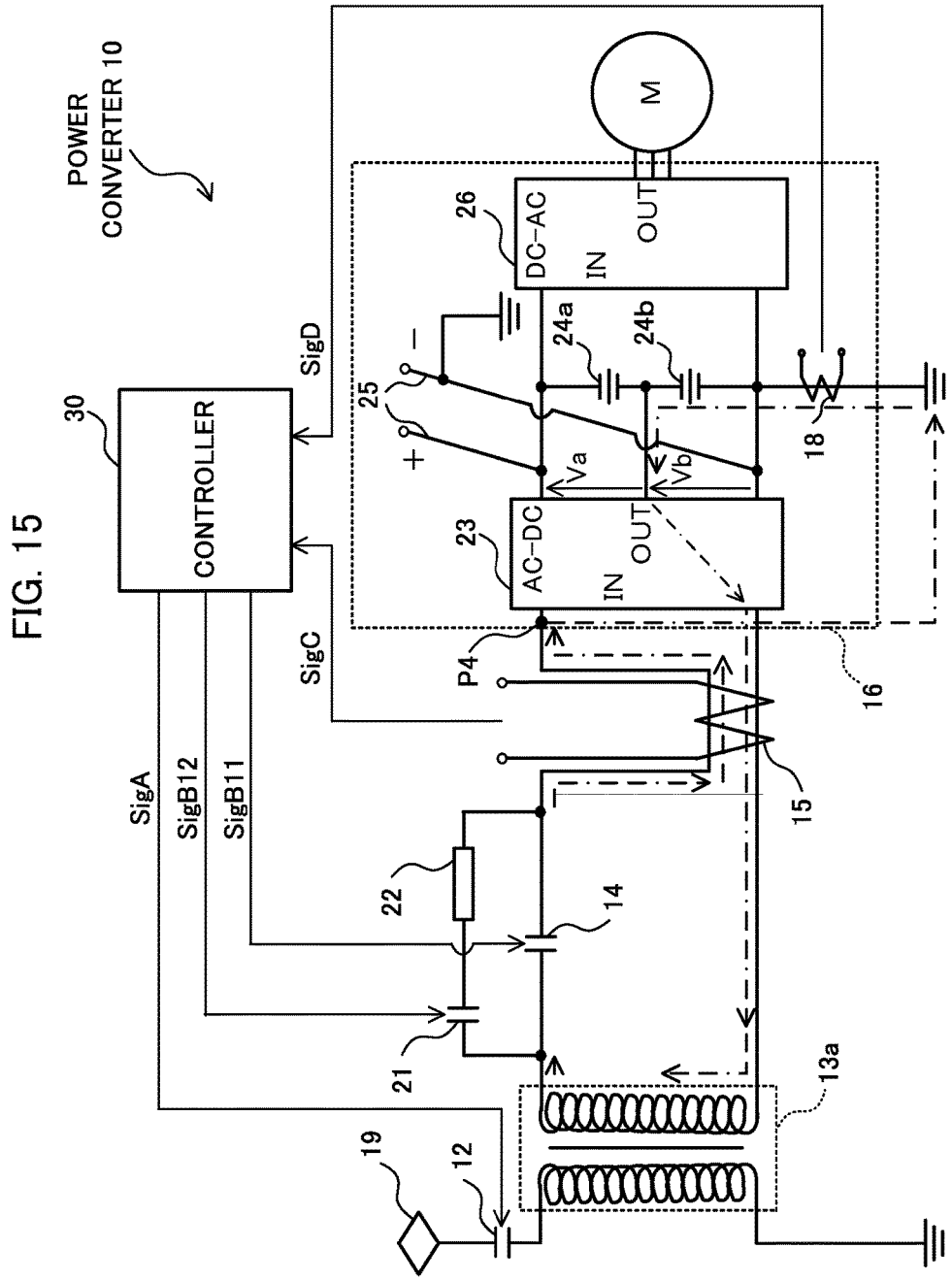
FIG. 15 is a diagram illustrating an example route of a line-to-ground fault current when a line-to-ground fault occurs at a position below the line-to-ground fault location detector.

Conversely, when the line-to-ground fault occurs at a point P4 that is below the line-to-ground fault location detector 15, the line-to-ground fault current flows in sequence, as illustrated in FIG. 15, through the point of line-to-ground fault P4→the ground→the second filter capacitor 24b→the second terminal of the AC-DC converter 23→the other input terminal of the AC-DC converter 23→the other end of the secondary winding of the transformer 13a the one end of the secondary winding of the transformer 13a. Subsequently, when the third contactor 21 is in the closed state, and the second contactor 14 is in the open state, the line-to-ground fault current flows through the third contactor 21 and the resistor 22, but when the third contactor 21 is in the open state and the second contactor 14 is in the closed state, the line-to-ground fault current flows through the second contactor 14 and reaches the point of line-to-ground fault P4.

Thus, the line-to-ground fault detector 18 detects the line-to-ground fault current. The line-to-ground fault location detector 15 detects no current difference.

When the voltage of the voltage signal SigD is equal to or greater than the threshold value, the line-to-ground fault monitor 310 determines that the line-to-ground fault has occurred. Next, the line-to-ground fault monitor 310 outputs, to the contactor controller 320, the line-to-ground fault detection signal Sg that indicates the occurrence of the line-to-ground fault.

In addition, when the obtained voltage of the voltage signal SigC is equal to or greater than the threshold value, the line-to-ground fault monitor 310 determines the occurrence of the line-to-ground fault at a position above the line-to-ground fault location detector 15, and outputs the line-to-ground fault location detection signal Sb to the contactor controller 320. Conversely, when the voltage of the voltage signal SigC is smaller than the threshold value, the line-to-ground fault monitor 310 determines the occurrence of the line-to-ground fault at a position below the line-to-ground fault location detector 15, and outputs no line-to-ground fault location detection signal Sb.

When the electric motor car is present in the AC power territory, and when information indicating that the voltages of the filter capacitors 24a and 24b are smaller than the threshold value is output by the voltmeter 322, the contactor controller 320 opens the second contactor 14, closes the third contactor 21, and then closes the first contactor 12. Hence, the first filter capacitor 24a and the second filter capacitor 24b become the initial charge condition.

Subsequently, when the voltmeter 322 outputs information indicating that the voltages of the filter capacitors 24a and 24b are equal to or greater than the threshold value, the contactor controller 320 closes the second contactor 14, and opens the third contactor 21 to cause the power converter 10 to be in the steady state (the closed state of the first contactor 12 is maintained).

Thereafter, when receiving the line-to-ground fault detection signal Sg indicating the occurrence of the line-to-ground fault, the contactor controller 320 opens the first contactor 12, the second contactor 14, and the third contactor 21. Hence, the contactor controller 320 can prevent a damage to the transformer 13a at the time of the occurrence of the line-to-ground fault.

In addition, when the line-to-ground fault location detection signal Sb is stored, the contactor controller 320 maintains the open state of the first contactor 12 to prevent a damage to the transformer 13a caused by the line-to-ground fault current flowing to the transformer 13a even if an instruction for closing of the first contactor 12 is input.

Conversely, when no line-to-ground fault location detection signal Sb is stored, the contactor controller 320 closes the first contactor 12 when the instruction for closing of the first contactor 12 is input.

Note that when the electric motor car is present in a DC power territory, the contactor controller 320 opens the first contactor 12, the second contactor 14, and the third contactor 21.

Note that in the case of the electric motor car applications, a contactor may be disposed for each load as exemplified in FIG. 7.

Embodiments of the present disclosure are described above, but the present disclosure is not limited to the aforementioned Embodiments, and various modifications and applications can be made thereto.

According to the power converter 10 illustrated in FIG. 11, the two capacitors, namely, the first filter capacitor 24a and the second filter capacitor 24b construct the series circuit charged by the DC voltage that is output by the output terminals of the AC-DC converter 23, but the present disclosure is not limited to this structure. That is, the number of filter capacitors constructing the series circuit may be, for example, one.

Various embodiments and modifications can be made in the present disclosure without departing from the spirit and the broad scope thereof. Embodiments described above are intended for purposes of illustration only and are not intended to limit the scope of the present disclosure in any way. Therefore, the scope of the present disclosure is defined by the appended claims rather than Embodiments described above. Further, various modifications made within the scope of the claims and within the same purposes thereof should be included within the scope of the present disclosure.

INDUSTRIAL APPLICABILITY

The present disclosure can be utilized in various devices besides the electric motor cars that convert power.

REFERENCE SIGNS LIST 10, 20 Power converter
11 Current input terminal
12 First contactor
13, 130 Power transmission circuit
13a Transformer
14, 141, 142 Second contactor
15 Line-to-ground fault location detector
16 Load circuit
17 Power source circuit
18 Line-to-ground fault detector
19 Pantograph
21 Third contactor
22 Resistor
23 AC-DC converter
24a First filter capacitor
24b Second filter capacitor
25 DC voltage application terminal
26 DC-AC converter
30, 31 Controller
310, 311 Line-to-ground fault monitor
320, 321 Contactor controller
322 Voltmeter

The invention claimed is:

1. A power converter comprising:
    a power transmission circuit that outputs AC power upon receiving power supplied from an external circuit;
    a first contactor that controls making and breaking of a current that flows between the power transmission circuit and the external circuit;
    a load circuit that is operated by the power output by the power transmission circuit, and detects a current flowing through a grounded terminal, thus capable of detecting an occurrence of a line-to-ground fault;
    a second contactor that controls making and breaking of a current that flows between the power transmission circuit and the load circuit;
    a line-to-ground fault location detector that detects, based on a difference between a current flowing from the power transmission circuit to the load circuit, and a current flowing from the load circuit to the power transmission circuit, whether the line-to-ground fault is occurring at a power-transmission-circuit side or at a load-circuit side; and
    a contactor controller that controls the first contactor and the second contactor based on a detection result by the load circuit on the occurrence of the line-to-ground fault, and a detection result by the line-to-ground fault location detector.

2. The power converter according to claim 1, wherein the contactor controller opens the first contactor when the load circuit detects the occurrence of the line-to-ground fault, and when the line-to-ground fault location detector detects that a location of the line-to-ground fault is at the power-transmission-circuit side, the contactor controller maintains an open state of the first contactor even if an operation to instruct closing of the first contactor is made after the first contactor is opened.

3. The power converter according to claim 1, wherein the contactor controller opens the first contactor when the load circuit detects the occurrence of the line-to-ground fault, and when the line-to-ground fault location detector detects that a location of the occurring line-to-ground fault is at the load-circuit side, the contactor controller closes the first contactor after opening the second contactor when an operation to instruct closing of the first contactor is made.

4. The power converter according to claim 1, wherein:
    the power transmission circuit includes a pair of output terminals, and the load circuit includes a pair of input terminals;
    the second contactor is disposed on an electrical path that connects one output terminal of the power transmission circuit with one input terminal of the load circuit; and
    the line-to-ground fault location detector obtains a difference between a current flowing through an electrical path that connects the second contactor with the load circuit, and a current flowing through an electrical path that connects the other output terminal of the power transmission circuit with the other input terminal of the load circuit.

5. The power converter according to claim 1, wherein:
    the power transmission circuit includes a plural pairs of output terminals;
    the second contactor, the load circuit, and the line-to-ground fault location detector are provided for each pair of output terminals of the power transmission circuit; and
    the contactor controller opens the first contactor when any one of the load circuits detects the occurrence of the line-to-ground fault, and when the line-to-ground fault location detector corresponding to the load circuit detecting the line-to-ground fault detects that a location of the line-to-ground fault is at a power-transmission-circuit side, the contactor controller maintains an open state of the first contactor even if an operation to instruct closing of the first contactor is made after the first contactor is opened.

6. The power converter according to claim 1, wherein:
    the power transmission circuit includes a transformer to which an AC voltage is applied upon closing of the first contactor; and
    the load circuit includes a power conversion device that converts the AC power supplied from the transformer to a DC power upon closing of the second contactor, and outputs the DC power.

7. A power conversion method for a power converter comprising:
    a power transmission circuit that outputs AC power upon receiving external power supply; and
    a load circuit that is operated by the power supplied from the power transmission circuit,
    wherein the method comprises:
    detecting an occurrence of a line-to-ground fault by measuring a line-to-ground fault current flowing through a grounded terminal of the load circuit;
    detecting, based on a difference between a current flowing from the power transmission circuit to the load circuit, and a current flowing from the load circuit to the power transmission circuit, whether the line-to-ground fault is occurring at a power-transmission-circuit side or at a load-circuit side; and
    breaking power supply to the power transmission circuit when a line-to-ground fault current is detected, and maintaining the breaking state of the power supply upon detection that a location of the line-to-ground fault is at the power-transmission-circuit side, even if an operation to instruct power supply to the power transmission circuit is made after the power supply is broken.

* * * * *